(12) United States Patent
Fratila

(10) Patent No.: US 7,907,977 B2
(45) Date of Patent: Mar. 15, 2011

(54) ECHO CANCELLER WITH CORRELATION USING PRE-WHITENED DATA VALUES RECEIVED BY DOWNLINK CODEC

(75) Inventor: Adrian Fratila, Ascot (GB)

(73) Assignee: Agere Systems Inc., Allentown, PA (US)

( * ) Notice: Subject to any disclaimer, the term of this patent is extended or adjusted under 35 U.S.C. 154(b) by 830 days.

(21) Appl. No.: 11/866,178

(22) Filed: Oct. 2, 2007

(65) Prior Publication Data
US 2009/0088223 A1  Apr. 2, 2009

(51) Int. Cl.
H04M 1/00 (2006.01)
(52) U.S. Cl. .............. 455/570; 379/406.01; 379/406.05; 379/406.08; 370/286; 370/289
(58) Field of Classification Search .................. 455/570, 455/550.1, 517, 419.4; 379/406.01–406.08; 381/97.1, 71.1–71.14; 375/220; 330/149; 370/286, 289
See application file for complete search history.

(56) References Cited

U.S. PATENT DOCUMENTS

| | | | |
|---|---|---|---|
| 4,697,261 A | | 9/1987 | Wang et al. |
| 6,011,846 A * | | 1/2000 | Rabipour et al. ......... 379/406.06 |
| 6,498,796 B2 * | | 12/2002 | Wang et al. .................. 370/466 |
| 6,721,306 B1 * | | 4/2004 | Farris et al. .................. 370/352 |
| 6,744,886 B1 * | | 6/2004 | Benesty et al. .......... 379/406.08 |
| 6,768,914 B1 * | | 7/2004 | Garey ......................... 455/569.1 |
| 6,865,270 B1 | | 3/2005 | Troxel |
| 7,035,397 B2 | | 4/2006 | Diethorn |
| 7,050,969 B2 | | 5/2006 | Raj et al. |
| 7,428,304 B2 * | | 9/2008 | Prabhakar et al. ....... 379/406.01 |
| 7,440,891 B1 * | | 10/2008 | Shozakai et al. .............. 704/233 |
| 7,564,964 B2 * | | 7/2009 | Takada ..................... 379/406.08 |
| 2003/0076948 A1 * | | 4/2003 | Nishimura ............... 379/406.01 |
| 2003/0231763 A1 * | | 12/2003 | Lilliott et al. ............ 379/406.01 |
| 2004/0062386 A1 * | | 4/2004 | Tahernezhaadi et al. ............................ 379/406.01 |
| 2005/0129226 A1 * | | 6/2005 | Piket et al. ............... 379/406.01 |
| 2006/0153359 A1 * | | 7/2006 | Stenger .................... 379/406.01 |

FOREIGN PATENT DOCUMENTS

WO   WO 86/02726   5/1986

OTHER PUBLICATIONS

Tero Piirainen, "Advanced Speech Coding in VoIP", Seminar Report, 83390 Advanced Topics in Broadband Networks, Tampere University of Technolgoy, Aug. 12, 2000.
GSM Global System for Mobile Communications, "Digital Cellular Telecommunications System (Phase 2+)", ETSI TS 126 171 V6.0.0 Technical Specification, Dec. 2004.
Seiichi Yamamoto et al, "An Adaptive Echo Canceller with Linear Predictor", The Transactions of the IECE of Japan, vol. E 623, No. 12 Dec. 1979, pp. 851-857.

* cited by examiner

*Primary Examiner* — Dominic E Rego

(57) ABSTRACT

Duplex audio communications over a network use compressed audio data, with linear prediction coefficients (LPCs) and variances by which sample values differ from predictions. A adaptive echo canceller for a transceiver develops finite impulse response filter (FIR) coefficients characterizing an echo path between its local audio output and audio input. The received/decompressed audio data is applied to the FIR coefficients, and the predicted echo is subtracted from the uplink signal. Echo is detected as cross-correlation of the receive signal versus the uplink/send signal over time. In one embodiment, the cross-correlation is determined using a pre-whitened receive signal, obtained by adopting the variance values received over the network by the downlink Codec. Apart from the uplink Codec, no speech analysis filter or process is needed. The technique is apt for GSM, AMR and similar compressed audio communications.

13 Claims, 3 Drawing Sheets

ECHO CANCELLER WITH CORRELATION USING PRE-WHITENED DATA VALUES RECEIVED BY DOWNLINK CODEC

BACKGROUND OF THE INVENTION

1. Field of the Invention

The invention concerns an echo canceller with a filter that adaptively updates a set of coefficients representing an estimated impulse response of an echo path, and subtracts the anticipated echo from a transmitted signal.

2. Prior Art

Echo cancellers are useful in duplex audio communications, speakerphone and hands-free apparatus and in other situations wherein an audio signal may be coupled from the output audio stages back to the input audio stages at one or both ends of a bidirectional communications path. Such coupling can be due to electrical circuit coupling or due to an acoustic path between an audio speaker back and a nearby microphone of a telephone handset or a desktop speakerphone or another communications device.

Echo can be experienced at either or both ends of a communication path. Both ends might have echo cancellers that operate independently. The existence of an echo path at one of the ends is perceived as an echo by the party speaking and listening at the opposite end.

For providing a frame of reference, echo cancellation can be discussed with respect to transceiver equipment at a "near" end, namely the end with the echo path, and the end with which the echo canceller is associated. The echo canceller associated with the near end is intended to prevent an echo from being perceived by a party speaking and listening at the "far" end.

The acoustic and/or electric echo path at the near end causes a delayed and typically-attenuated representation of the audio input signal originating at the "far" end microphone to be echoed back from the near end to the far end and to be heard in the far end audio speaker after a delay. There can be plural audio signal paths affecting the echo, for example reflection from respective walls in a room that are at different distances from a speakerphone.

An echo canceling apparatus is provided, typically disposed in the equipment at the near end but also potentially as an intervening element or process in network communications. The echo canceller senses the presence of an echo component by detecting correlation between the incoming signal received from the far end and the outgoing signal sent from the near end, at a time lag. The echo canceller adaptively characterizes the transfer function of the echo path (or paths), applies the incoming signal to the transfer function to predict the echo component that the far end party's speech is likely to produce, and subtracts away the predicted echo from the signal before that signal is sent from the near end to the far end.

More specifically, the echo path is modeled using an adaptive filter to develop a numerical characterization of the impulse response of the echo path. An "impulse" is a theoretical pulse of infinite amplitude and zero time duration. A theoretical impulse is considered to produce an echo response characterized as a list of amplitudes (known as coefficients), finite in number, at successive time sample points following the impulse. The filter is termed a finite impulse response filter ("FIR") because the number of filter coefficients, and the time period the coefficients encompass, are limited.

The estimate of the expected echo signal is continuously generated by applying the instantaneous value of the audio signal to the impulse response filter. Each instantaneous audio signal value, or sample, produces a list of echo component values that are predicted to result, at sample times extending into the future. As each successively sampled instantaneous value is applied to the impulse response filter, the resulting echo component values at subsequent times are added to the echo component values that were predicted to result from earlier instantaneous values. The accumulated estimated echo component values are subtracted from the audio signal that is being transmitted from the near end to the far end.

Insofar as the adaptive filter coefficients prove to be inaccurate, residual echo remains in the signal. Residual echo can be detected by the correlation between the audio received at the near end, versus the audio sent from the near end less the predicted echo. The residual echo is used as an error value in a feedback control loop that causes the filter coefficients to be adjusted. Over time, the filter coefficients home in on an accurate characterization of the echo path. The coefficients are said to "converge." Ideally, convergence is quick and accurate, leaving virtually no echo in the signal sent back from the near end to the far end.

A new convergence may become necessary if the situation changes. For example, an echo path affected by a speakerphone at the near end may be changed if the speakerphone is physically moved or if acoustically reflective structures are moved near the speakerphone.

The echo component (and the residual echo) can be identified and measured in the cross correlation of the audio received from the far end and the audio sent from the near end, due to the echo path. There may be plural echo paths with distinct lag times, but echo is synonymous with correlation at some lag time(s) due to such paths. Minimizing residual echo might be conceived as adjusting the filter coefficients to eliminate echo-related correlation. But there is a problem. There is substantial correlation between the audio received from the far end and the audio sent from the near end, which correlation is not due to echo. For example, normal human speech has a high level of autocorrelation over the time spans of interest. Anomalies occur, such as opposite-end parties speaking at the same time ("double-talk"), that give rise to momentary cross-correlation that is not echo. If the controls that attempt to adjust and converge the adaptive filter coefficients are highly responsive, which seems advantageous to converge the coefficients quickly, then the controls will respond to autocorrelation and to non-echo correlation, rendering the filter coefficients inaccurate or actually increasing the time needed to converge.

As a technique to improve the rate at which the impulse response filter converges on an accurate characterization of the echo path, the received audio signal from the far end and the outgoing audio signal from the near end can be processed to reduce their inherent autocorrelation and non-echo cross-correlation, before attempting to detect cross correlation that may represent echo. In one technique, these signals are "pre-whitened" using a filter to remove components of the audio signal that may correlate for reasons other than echo. This reduces the signal to noise ratio of the signals input to the process or device that assesses correlation, but the rate of convergence actually is improved because correction of the filter coefficients is driven more strongly by the echo component and less strongly by the confounding factors of inherent autocorrelation and cross correlation in speech signals.

The adaptive circuits that converge the impulse response definition coefficients employ an error correction algorithm. A high or continuous degree of cross correlation of the audio signal being transmitted and a component of the audio signal received over the echo path after a time lag, indicate the presence an error to be minimized by adjusting the impulse response coefficients. The algorithm may make stepwise corrections in an amount related to the magnitude of detected error, to speed convergence. The algorithm may be arranged to suspend making corrections when a double talk situation is detected, to avoid making changes that actually degrade the accuracy of already converged coefficients. Some echo cancellers generate plural sets of impulse response filter coefficients, and switch back and forth to use the set of filter coefficients that is found to result in the least residual echo.

The error correction algorithm for the near end transceiver needs to respond to cross-correlation at a time lag, between the signal received from the far end and the signal sent from the near end, when the cross-correlation is due to echo. A challenge is presented in the fact that human speech inherently contains substantial autocorrelation (namely correlation of a given signal to itself at points spaced in time), and also cross-correlation independent of echo, such as cross-correlation between the audio characteristics of the speech of different speakers).

In theory, convergence is quickest when conducted without the influence of inherent forms of correlation of audio speech signals. An adaptive filter might converge most quickly if the input signals (the near end transmit signal and the receive signal from the far end) are not cross-correlated and have low autocorrelation. There is no such correlation between audio signals that are broadband white noise. Correlation of speech signals may be low if the speech contains fricative sounds (e.g., hiss, "th" or "sh" sounds, etc.). Normal voiced speech sounds correlate inherently.

A known technique intended to improve the rate of convergence of an echo canceller, filters the audio signals by pre-processing to select for attributes of the signals that most resemble broadband noise. These attributes do not have the high levels of autocorrelation or cross-correlation inherent in the original speech signals. U.S. Pat. No. 4,697,261—Wang et al., the teachings of which are hereby incorporated, discloses the step of pre-whitening the received speech signal to improve the rate of convergence, citing S. Yamamoto et al., "An Adaptive Echo Canceller with Linear Predictor," Trans. IDE Japan, 1979, pp. 851-857 and international application PCT/US85/02168 (WO 86/02726). Pre-whitening is accomplished using a speech analysis and speech synthesis unit as implemented in a digital signal processor according to WO 86/02726. The received audio signal is applied to a spectral analysis unit that produces linear prediction coefficients substantially characterizing the frequency components of the signal, and residual values ("variances") representing the differences between the actual values of audio signal samples and the values that would have been predicted by the linear prediction coefficients.

The linear prediction coefficients represent the redundant aspects of the audio signal during a sampling interval. The residual values or variances provide a pre-whitened representation of the received speech signal from the far end because redundancies that would lead to high autocorrelation apart from echo are contained in the linear prediction coefficients, not in the residual sample values (variances). This pre-whitened receive signal is the input used for correlation with the send signal in the detection and suppression of residual echo. In order to exploit this technique, it is necessary to provide a digital signal processor embodying a speech analysis unit devoted to producing the pre-whitened version of the receive signal as described. This solution is expensive and complex.

It would be advantageous to de-correlate the send and receive signals so as to improve the speed of convergence as described, but to do so in a manner that is less complicated and expensive while remaining effective. These objectives are difficult to achieve if the already complex echo canceller adaptive filter elements also need to include a digital signal processor devoted to pre-whitening the received signal. The objectives are likewise difficult if the transceiver unit is based on a processor because a substantial portion of available processing capacity may be devoted to the pre-whitening function. What is needed is a better way to separate the transmitted near end audio signal and the received far end audio signal into constituent signal components that are inherently de-correlated, and to use the de-correlated components to control the echo canceller error estimation and convergence of the impulse response filter coefficients.

SUMMARY OF THE INVENTION

It is an aspect of the present invention that existing linear prediction coefficients and residual sample values are exploited as de-correlated versions of the near and far end signals. These values, and in particular the residual samples or variances, are made available to an echo canceller directly from the network Codec that is operable normally to convert speech audio data back and forth between pulse code modulated (PCM) data and compressed/encoded data such as Global System for Mobile communications ("GSM" or Groupe Spécial Mobile) or Adaptive Multi-Rate ("AMR") encoding and decoding processes.

According to an inventive aspect, a pre-whitened version of the downlink audio signal received from the far end is provided by the variance values that are communicated over the communications network. The linear prediction coefficients and variances from the download Codec (an abbreviation of coder-decoder or compressor-decompressor) are adopted.

The foregoing aspects are applicable to wireless communications such as cellular telephone systems, and/or voice-over-Internet protocol (VoIP) communications over digital networks in general, such as the Internet. It is not necessary to provide a digital signal processor in the near end transceiver or otherwise to pre-whiten the received audio at the near end because the residual sample values at the Codec are available as a preexisting whitened version of the received audio, namely the version produced at the far end by encoding the digital signal for transmission from the far end to the near end.

According to one aspect of the invention, in a digital audio arrangement that uses audio Codecs for signal transmission, the linear prediction coefficients that are used to process the audio signal for transmission in compressed or coded form together with residual error sample values, are provided by the Codec to the echo canceller, thereby providing the necessary information to de-correlate the near and far end inputs to the adaptive filter convergence stages. The inputs include de-correlated values, i.e., pre-filtered representations of the audio that substantially omit redundancies and highly auto-correlated and/or inherently cross-correlated aspects of audio speech signals. The advantages or pre-whitening are obtained without the need for a speech analysis filter in the circuitry or data processing arrangements in an echo canceller processor. The residual error samples provided for transmission from either or both of the near and far end can be used in either or both of a near end echo canceller and a far end echo canceller for this purpose.

It is possible to whiten audio signals using a speech analyzer digital signal processing circuit element. However, the inventive echo canceller operates in a communication system that employs digital audio compression such a GSM or AMR or similar standard Codec, and de-correlates the near end sent audio and the returning far end audio signals by adopting the same linear prediction coefficients that were used to compress the audio signals for transmission by the audio Codec.

According to an advantageous embodiment, the linear prediction coefficients and residual error signal sample values, are extracted directly from one or another of the various standards for compressed digital audio transmission that employ linear predictive coefficient audio Codec equipment or processes.

It is an object to improve convergence time of an echo canceller by decorrelating the near end transmit signal component and the far end return signal component at the inputs to the stages that converge over time to optimize the impulse response filter coefficients characterizing the echo path. It is a further object to improve the convergence time be decorrelating, without the overhead of additional processing steps or hardware devices associated with separate speech analysis filters in echo cancellers.

BRIEF DESCRIPTION OF THE DRAWINGS

There are shown in the drawings certain exemplary embodiments of the invention as presently preferred; however the invention is not limited to the embodiments disclosed as examples, and should be assessed by reference to the appended claims. In the drawings.

DETAILED DESCRIPTION

Figure 1:
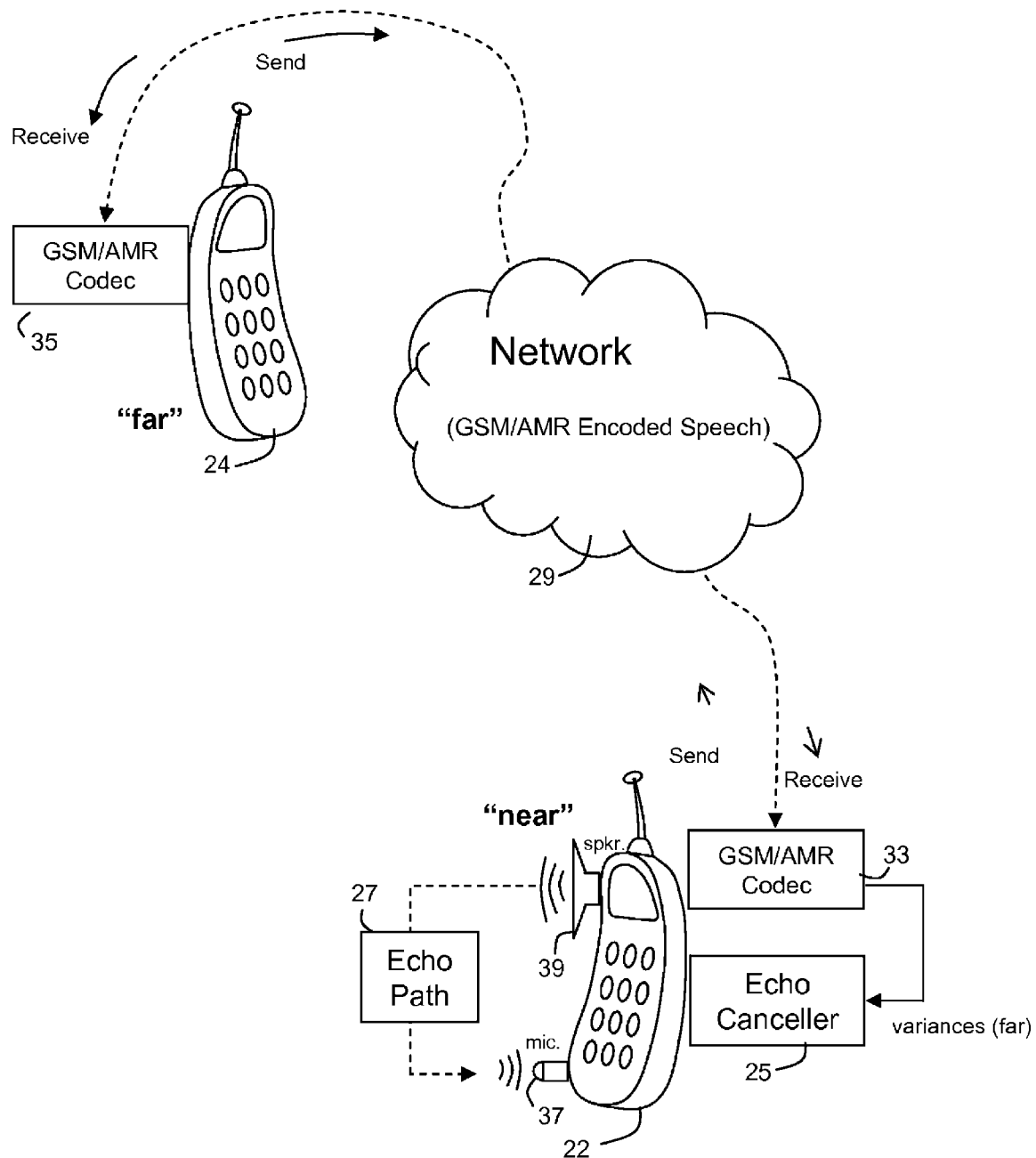
FIG. 1 is a general schematic showing audio communications according to the invention between near and far end terminal devices, wherein a Codec is used to compress and decompress respective send and receive audio signal data streams using linear prediction coefficients.

With reference to FIG. 1, the invention is applicable to a communications system and also to individual transceivers used in communications. For purposes of discussion, the invention is described with respect to echo cancellation provisions provided in a transceiver 22 at a "near end." These provisions serve substantially to cancel the effects of an echo path 27 at the near end, and thereby improve the quality of audio communications from the perceptive of a speaker/listener at the "far end" transceiver 24.

The far end speaker/listener may perceive an echo due to coupling between the audio output and audio input of the equipment at the near end over an echo path 27. The echo coupled from the near end audio output speaker 39 to the audio input, for example via microphone 37 contains the audio signal contributed by the far end speaker. It is understood that both the near end equipment and the far end equipment may be characterized by echo paths, and both ends may be equipped with echo cancellers. Nevertheless, the problem and its inventive solutions can be appreciated from the perspective of the echo canceller at the transceiver 22 associated with the near end speaker.

The general configuration of the communications system is shown schematically in FIG. 1. The transceivers 22, 24 are coupled to one another over a communications network 29 that has the capability of passing bidirectional digitally compressed audio signals. The network can be part of a hard wired telephone system with PBX installations, or a wireless system relying on cellular telephones and cell phone base stations, or the network can be a local or wide area network with various data communications capabilities besides packet data communications or streaming or other protocols that might be used to transmit and receive audio.

The bidirectional audio signals between transceivers 22, 24 through network 29 comprise encoded digital audio sample data wherein the data is compressed. The acoustic signals applied to the microphone input of a transceiver are time sampled at an analog to digital converter (See FIG. 2) to produce a succession of pulse code modulated sample values. At the output, a digital to analog converter produces a speaker drive signal to reproduce the acoustic audio at a speaker. The acoustic signal may be exemplified by the speech of a person using a cellular telephone or other telephone handset device.

Although handled as time spaced amplitude samples in the transceiver, the audio information is compressed for transmission over the network 29 and decompressed again when received, by suitable Codecs 42, 48. The time sampled audio signal contains substantial redundancy, due in part to the biophysical way that speech audio is generated from air pressure and flow through the vocal cords, resonant chambers of the pharynx, mouth and nasal cavity, etc. Characteristically, speech has tones that persist for a time and are varied by air constrictions (for fricatives such as the sounds of s, sh, f, th, etc.) and abrupt pressure changes (for plosives such a p, k, t, etc). In English, there are 40 phonemes or sound elements (16 vowel sounds, 24 consonants). These sounds have substantial redundancy considering an exemplary sampling frequency of 8 KHz (typical of telephone applications). Over a period of 20 to 30 mS, for example, a group of 160 to 240 samples are collected to define a frame or packet of audio samples.

A speech analysis process in a Codec provides a prediction characteristic whereby the values of the samples are approximated. For example, a set of polynomial expressions defining frequency peaks or nulls, and coefficients representing an average amplitude approximate the values of the samples. The coefficients of the polynomials are linear prediction coefficients, and are produced by the Codec and transmitted as part of the audio signal definition. In addition the error or variance values for time samples are transmitted and represent the difference between the value predicted by the coefficient and the actual value of the sample. At the other end of the communication path, a complementary Codec regenerates the compressed audio as time sample PCT amplitudes, namely by applying the received linear prediction coefficients to the polynomials and adjusting the output according to the variances to recover sample values.

The algorithms used, the number of coefficients provided for by the polynomials and the precise manner of their generation and use to reproduce audio vary according to the particular audio standard being used. As non-limiting examples, the drawings mention GSM (Groupe Spécial Mobile) and AMR (Adaptive Multi-Rate) as possible audio compression standards. The GSM standard uses a predetermined number of coefficients (six). The AMR standard uses a variable number of coefficients depending on the data rate supported and the error rate encountered. Various other standards are possible. According to the invention, substantially any compression and decompression standard that separately encodes redundant aspects (such as linear prediction coefficients) and non-redundant aspects (such as LPC variances) in connection with data compression, can be exploited because non-redundant aspects of encoded/compressed audio data constitute a pre-whitened audio data signal Over the exemplary GSM/AMR network 29 shown in FIG. 1, the linear prediction coefficients are transmitted together with variance or residual values. In a full duplex communication, the linear prediction coefficients or "LPCs" and the residual values or "variances" that represent the differences between encoded sample values and the predictions of those sample values, are continuously being sent and received in both directions.

Due to the redundancies of speech audio signals (such as the characteristic high autocorrelation level therein), fewer bits are needed to encode and transmit the linear prediction coefficients together with the residual values, than would be needed to transmit the sample values. The technique efficiently compresses audio data to be transmitted digitally, and decompresses the received digital data to reproduce the sample values. Industry standard complementary coder and decoder algorithms (which are sometimes called compression and decompression algorithms) are known and are generally termed "Codecs."

In FIG. 1, a near end GSM/AMR compatible Codec 33 and a far end GSM/AMR compatible Codec 35 are shown as elements of the transceivers, each being responsible to compress and send outgoing audio as LPC and variance value packets or streams and to receive and decompress the same packets or streams from their counterpart transceiver. Each transceiver has an audio input device such as microphone 37 and an audio output device such as acoustic speaker 39, and appropriate amplifiers, A/D and D/A converters in addition to the Codec(s) for interfacing the transceiver for uplink and downlink transmission and reception. The Codecs may be embodied in a digital signal processing chip or in a programmed process carried out by a controller or processor (not shown).

At the near end, transceiver 22 is configured for sending a signal and receiving a signal in communication with one or more remote transceivers 24. Generally, the job of transceiver 22 is to provide an audio output at the local speaker 39 to play out the audio (speech) signal that was transmitted from the far end transceiver 24, and also to encode and transmit the near end talker's input to microphone 37 to the far end. However, echo path 27 couples some of the audio output of transceiver 22 to the audio input, leading to an echo that will be heard by the speaker/listener at far end 24. Objects of the echo canceller 25 at the near end 22 are: to determine the presence of echo from correlation between the signal received from the far end and the signal nominally to be sent from the near end; to characterize the transfer function of the echo path quickly and accurately; to predict in an ongoing manner the echo that the presently-received audio signal will produce by propagating through the echo path 27; and to subtract the predicted/estimated echo away from the signal before transmitting the signal to the far end. Both the near and far end can have echo paths, and both transceivers can cancel echo. The near end is discussed for purposes of illustration, with the understanding that the same or similar provisions are generally made at the far end for eliminating echo that may be heard by the near end speaker due to an echo path (not shown) at the far end transceiver.

Figure 2:
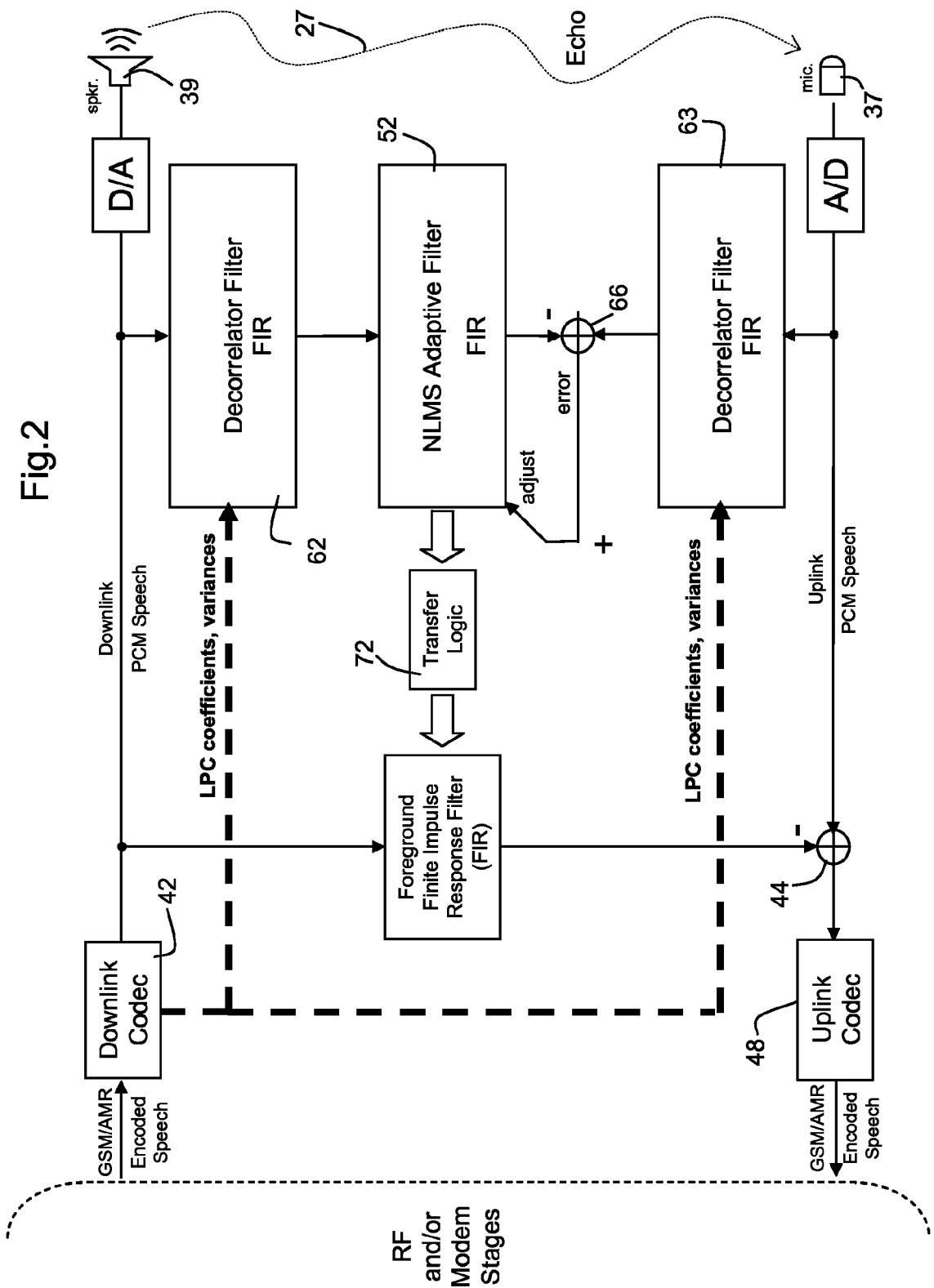
FIG. 2 is a block diagram showing components of the echo canceller in FIG. 1, wherein the linear prediction coefficients used by the Codec to compress and decompress digitally transmitted audio signals are coupled by data communications to the residual-echo detection convergence stages of an echo canceller.
Figure 3:
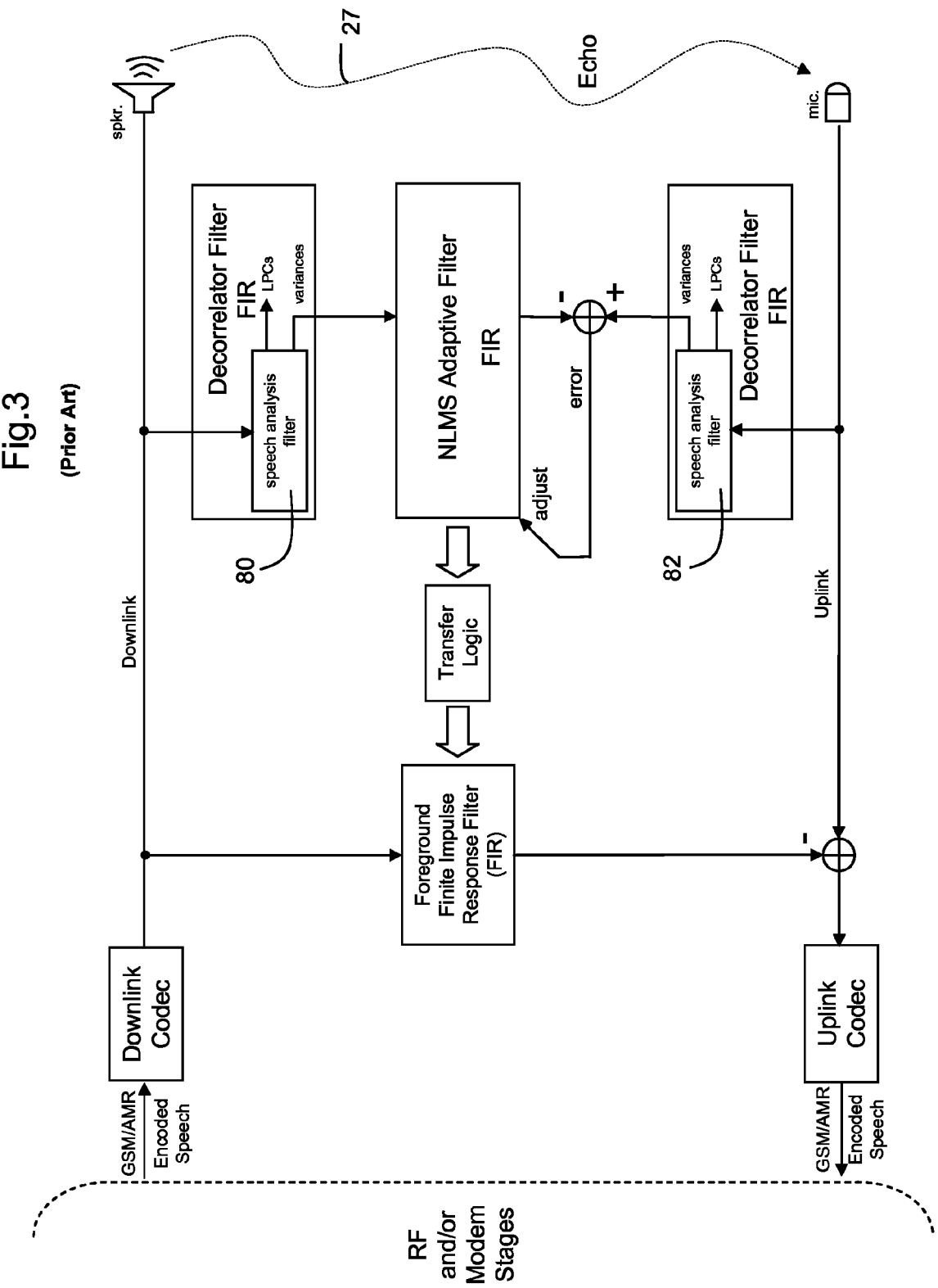
FIG. 3 is a block diagram labeled "prior art," showing the use of a whitening filter in an echo canceller to decorrelate the near and far end audio signals at the echo residual error detection stages of the echo canceller.

According to the invention as shown in FIG. 1, echo canceller 25 is included in near end transceiver 22. The applicable echo cancellation aspects of transceiver 22 are shown in FIG. 2. FIG. 3 is an illustration of the prior art approach to echo cancellation using decorrelation (pre-whitening) of the audio signals to be correlated to deduce the presence of echo.

FIG. 2 depicts elements one of the transceivers (e.g., near end transceiver 22). The two transceivers 22, 24 might be the same or different, but both communicate bidirectionally over the network via transmission and reception of digitally compressed audio data containing linear prediction coefficients and variances. The downlink Codec 42 operating as a decoder or decompressor (and can be a discrete circuit or a function of a digital signal processor) converts the compressed audio data back into time samples that are coupled through a digital to analog converter and amplifier (not shown) to the near side audio output device, shown as speaker 39.

The echo canceller comprises an adaptive finite impulse response filter that can comprise a foreground impulse response filter 50 in which a set of filter coefficients are stored, defining the finite impulse response of the echo path, namely a signal coupling by which the downlink received audio, for example emitted from speaker 39, is coupled to the uplink output signal, for example received and amplified from microphone 37. The input to the foreground finite impulse response filter (FIR) 50 is the pulse code modulated (PCM) time sampled audio from downlink Codec 42, applied to the FIR coefficients to produce a predicted echo signal. The predicted echo signal at the output of FIR 50 is subtracted at node 44 from the uplink PCM samples. This removes the predicted echo before the uplink signal is processed through uplink Codec 48 and transmitted by subsequent modulation of an RF carrier or other network medium.

The foreground FIR 50 is not adaptive of itself. However the FIR coefficients applied by foreground FIR 50 are the result of the echo canceller converging adaptively on a set of factors that are considered to accurately characterize the echo path 27. Convergence is a process of incrementally revising a set of FIR coefficients stored in an adaptive FIR 52. The adaptive filter 52 develops coefficients by an algorithm wherein FIR coefficients are iteratively refined (incrementally increased or decreased) as necessary to reduce the correlation found between the downlink PCM audio and the uplink PCM audio before subtraction of the estimated echo signal. More particularly, the FIR coefficients are moved upward or downward in increments that are related to the normalized least mean square (NLMS) residual echo found after application of the converging FIR coefficients by the adaptive FIR 52.

The adaptive FIR coefficients represent the tentative impulse response characteristic of the echo path 27. The PCM downlink speech samples are applied to the coefficients of the adaptive FIR 52. The tentative echo signal is subtracted from the PCM uplink speech samples at node 66 and the remainder is a residual echo that would remain if the coefficients of adaptive FIR 52 were used in the foreground FIR 50. The residual echo is an error signal applied in a feedback loop to control the amount of incremental adjustment of NLMS adaptive FIR 52. The coefficients of adaptive FIR 52 converge. According to some criteria, for example associated with sufficient accuracy or other conditions, the coefficients of adaptive FIR 52 are loaded by transfer logic 72 into the foreground FIR to cancel the predicted echo in the uplink PCM data at node 44.

For the reasons discussed above, the downlink and uplink PCM speech signals are not used directly by the NLMS adaptive filter to assess the correlation of the uplink signal (containing echo) and the downlink signal (the input to the echo path 27). Instead, the uplink and downlink speech signals are first decorrelated by pre-whitening, so that portions of the uplink and downlink signals that are not inherently correlated or auto-correlated are used to assess the correlation of the downlink and uplink signals that is associated substantially with echo.

As shown in FIG. 3, the prior art technique for decorrelating or pre-whitening the uplink and downlink signals is to apply the signals to speech analysis filters 80, 82 that remove the redundant elements, and extract the randomized elements, particularly from the downlink speech signal, for use in operating the NLMS adaptive FIR. This technique requires digital signal processing circuits or processors running programmed algorithms, namely speech analysis filter elements 80, 82.

According to an aspect of this disclosure and as shown in FIG. 2, the output of the pre-whitening speech filters is recognized to comprise random components of a speech signal that has relatively redundant components and relatively non-redundang components. GSM or AMR LPC coefficients represent redundant components, and variances represent the random components, for example. The separation of redundant and random components is also accomplished by when an uplink signal is encoded by an uplink Codec 48 and communicated over the network 29 to the downlink Codec 42 at the other end of the communication. Therefore, according to an inventive aspect, the random component of the downlink audio signal, namely the variance values of the LPC and variance compressed audio GSM/AMR signal is employed to produce the pre-whitened signals used to assess correlation of the downlink and uplink signals at the NLMS adaptive FIR 52.

As shown in FIG. 2, the LPC and variance values are coupled from the downlink Codec 42 to both the downlink decorrelator filter 62 and the uplink decorrelator filter 63. At the uplink decorrelator filter, the pre-whitened downlink signal based on the variance values is mathematically correlated against the uplink PCM signal (before echo cancellation). At the downlink decorrelator filter, the LPC variances can also characterize the downlink signal. Thus the decorrelator filters operate on pre-whitened audio signal components. The NLMS adaptive filter 52 responds strongly to the whitened (randomized) signal components and is relatively immune from the redundant components that are inherently auto-correlated and cross correlated. The NLMS adaptive filter 52 converges quickly and it is not necessary to provide speech analysis filters. The speech analysis function needed for pre-whitening in the near end echo canceller is supplied by feeding the LPC coefficients and variances to the downlink Codec, in the form of the same data that was generated by the uplink Codec at the far end when compressing the audio PCM data for transmission.

The invention is operable generally in communications systems that handle duplex audio communications, thereby being subject to echo, wherein the manner of encoding and decoding audio samples before and after transmission comprises producing coefficients that are based on redundancy, such as linear prediction coefficients, and values that are base on values with redundancy reduced or eliminated, such as residual error variance values that shall modify values predicted by the coefficients to recover the values of the original audio samples, typically with limited loss. Standard GSM/AMR compatible signals, among others, fall into this category. Thus, one or both of the transceiver and the remote transceiver can comprise a cellular telephone that sends and receives GSM/AMR compatible signals. One or both of the transceivers likewise can comprise a voice-over-Internet protocol transceiver that sends and receives GSM/AMR compatible signals.

The far-end uplink Codec (not shown) is a form of whitening filter that is useful to produce a pre-whitened signal component for assessing correlation between the received downlink PCM audio and to-be-transmitted uplink audio signal (prior to echo cancellation) by the echo canceller at the near end. Likewise, the outputs of the near-end uplink Codec 48 could be used in a comparable way by an echo canceller at the far end (not shown). Considering a situation wherein one of the transceivers uses the technique of the invention, the resources devoted to speech analysis in that transceiver are reduced at least by half by elimination of the functions of speech analysis filter 80 shown in FIG. 3. If two speech analysis filters 80, 82 are eliminated (compare FIGS. 2 and 3), then two thirds of the speech analysis resources are unnecessary. Preferably, the uplink coder/decoder (Codec 48) provides data that can be exploited by echo cancellers as shown in FIG. 2, for the transceivers at both the near end and the far end.

The uplink Codec for either of both of the transceivers can be a digital signal processing circuit element or a programmed operation effected by a processor. In any event, a speech analysis coder device or process encodes the respective send (uplink) signal for the respective transceiver as a compressed audio data stream in GSM/AMR or another standard format comprising linear prediction coefficients and residual error values that can be decoded by the receiving transceiver. At the other end of the transmission (the near end in our example), a corresponding decoder receives the linear prediction coefficients and residual error values for the received signal and reproduces an audio signal containing the component that was sent by the remote transceiver and is coupled as an input into the near transceiver echo path. According to an inventive aspect, part of the encoded data that was received by the downlink Codec, especially the variance values or a similarly separate whitened component of a GSM/AMR signal, are applied in the echo canceller as decorrelated (whitened) versions of the downlink audio. The correlation between the send or uplink audio and the receive or downlink audio (which is the correlation that assesses the presence of echo and provides error correction feedback to the NLMS adaptive filter 52) is calculated using this pre-whitened version of the downlink audio. That is, the pre-whitened downlink audio taken substantially direct from the downlink Codec 42, is correlated against the uplink audio that contains any echo that was inserted into the uplink audio through the echo path 27.

In other respects, the echo canceller operates in a known manner to iteratively re-estimate the transfer function of the echo path using the NLMS adaptive filter, subject to feedback based on the residual echo determined from node 55. The FIR coefficients thereby obtained are used, for example as fixed coefficients in a foreground FIR 50, to subtract away the predicted echo at node 44, whereupon the remainder (the uplink audio without echo) is coupled to the uplink Codec 48 and sent to the transceiver at the opposite end of the duplex communication. The transceiver at the far end may have the same sort of echo canceller or may have a conventional one as in FIG. 3.

Inasmuch as the near end echo canceller assesses echo in the uplink PCM speech audio using the pre-whitened component of the downlink audio, the echo canceller converges quickly and is insensitive to autocorrelation in the send and/or receive signals or cross correlation that is not the result of echo. It would be possible to provide a pre-whitened version of the uplink PCM speech signal for correlation against the pre-whitened downlink PCM speech signal. However this is not necessary. The pre-whitened downlink PCM audio can be correlated against the raw (unseparated) uplink PCM audio signal and the result will vary with the extent of included echo. No speech analysis circuits or pre-whitening filters are needed, apart from the uplink Codecs on both the near and far ends, necessary even apart from the inventive echo cancellation function, to digitally compress the audio signal for transmission over the network 29.

The invention comprises the foregoing apparatus and system aspects, and also the communications method that is involved. This method includes the steps of establishing two way communications between a near end transceiver and a far end transceiver over a communications network wherein the transmitted signals comprise compressed digital audio having relatively more redundant signal components (such as LPC coefficients) and relatively less redundant signal components (such as LPC variances), that are decoded to recover a downlink PCM audio signal that is coupled through an echo path back to an uplink PCM audio signal. The echo of the downlink audio signal is detected by correlating a component of the downlink audio against at least a component of the uplink audio, for adaptively determining a set of FIR coefficients that characterize a transfer function of the echo path. However, this correlation is accomplished using the relatively less redundant signal components of the downlink audio signal. The relatively less redundant components comprise a pre-whitened component of the downlink audio and can be obtained substantially directly from the downlink Codec.

As discussed, the network wherein relatively more redundant and relatively less redundant components are transmitted can be a GSM/AMR network wherein the more redundant component comprises LPC coefficients and the relatively less redundant components comprise the variances or residual values by which sample PCM time sampled audio amplitude values differ from values that re predicted by the redundant LPC component. These variances or residual values are a pre-whitened version of the downlink audio and are obtained without the need to apply a speech analysis filter because the pre-whitened version is extracted from the data in the format transmitted over the network and received by the downlink Codec.

Using correlation between the pre-whitened version of the downlink signal versus the uplink duplex communication signal, the presence of echo is detected. In an adaptive filter responsive to residual feedback, a set of FIR coefficients are developed, converging over a period of time to characterize the echo path as a set of impulse response values at time samples stretching forward from the time of a theoretical impulse in the downlink audio signal. These coefficients, once converged, are applied to the downlink audio signal in real time, thereby generating a predicted echo signal. The predicted echo signal is subtracted from the uplink audio before transmission back over the uplink to the far end, thereby removing the echo of the downlink audio that was coupled into the uplink audio signal via the echo path.

The invention is operable according to any compression technique that produces a component signal that is a relatively whitened or broadband signal component, such as the residual prediction error values (variances) as discussed. Thus the invention is applicable to various digital data communication standards. Exemplary but nonlimiting standards are the GSM (Global System for Mobile communications) standard and the AMR (Adaptive Multi-Rate) standard. The invention is particularly applicable to embodiment in mobile telephone handsets, voice-over-Internet protocol (VoIP) installations and similar communications.

The invention has been disclosed in connection with a number of examples and preferred arrangements, but is not limited to these examples and is capable of embodiment in other ways that will now be apparent. Reference should be made to the appended claims rather than the explanation of examples, to assess the scope of the invention in which exclusive rights are claimed.

What is claimed is:

1. A communications system comprising:
   a transceiver configured for sending a signal and receiving a signal in communications with remote transceivers, wherein the transceiver is subject to coupling between a downlink received signal and an uplink send signal, forming an echo path;
   wherein said communications are received at least partly through at least one downlink Codec in a compressed format employing a relatively more redundant component and a relatively less redundant component;
   an echo canceller associated with the transceiver, the echo canceller comprising an adaptive finite impulse response filter configured to correlate at least a component of the received signal with at least a component of the send signal, and to converge on a set of coefficients that characterize the echo path;
   wherein the echo canceller further comprises a filter for applying the received signal to the set of coefficients to generate a predicted echo signal and a summing node at which the predicted echo signal is subtracted from the send signal, thereby removing echo from the send signal;
   wherein correlation of the received signal and the send signal is based upon a pre-whitened component of the received signal, and wherein the pre-whitened component is derived from the relatively less redundant component of the received signal of the compressed format.

2. The communications system of claim 1, wherein the signals sent and received by the transceiver and the remote transceiver include digitally encoded compressed audio signals comprising linear prediction coefficients and variance values, and wherein said relatively less redundant component comprises the variance values.

3. The communications system of claim 2, wherein the signals sent and received by the transceiver and the remote transceiver comprise standard Groupe System Mobile (GSM) compatible signals.

4. The communication system of claim 2, wherein the signals sent and received by the transceiver and the remote transceiver comprise standard Adaptive Multi-Rate (AMR) compatible signals.

5. The communications system of claim 2, wherein at least one of the transceiver and the remote transceiver comprises one of a cellular telephone and a voice-over-Internet protocol transceiver.

6. The communication system of claim 1, wherein the pre-whitened component of the received signal comprises pulse code modulated variance samples and is correlated in the adaptive filter against pulse code modulated amplitude samples of the send signal including said echo.

7. The communication system of claim 2, comprising at least one Codec at a far end transceiver, operable to compress a far end audio signal to provide the received signal at a near end in the compressed format, wherein the compressed format comprises linear prediction coefficients and variance values, and wherein the variance values from the Codec are adopted by the echo canceller as the pre-whitened component of the received signal.

8. The communication system of claim 7, further comprising a Codec in transceivers at each of the near end and the far end, each said Codec comprising a speech analysis coder for encoding the respective said sent signal for the respective said transceiver as linear prediction coefficients and residual error values for the sent signal to be transmitted to the other of the near end and the far end, and a speech reproduction decoder for receiving linear prediction coefficients and residual error values for the received signal and reproducing the received signal for a respective transceiver at the near end the far end.

9. The communication system of claim 1, further comprising a foreground impulse response filter, and transfer logic for loading the coefficients of the adaptive impulse response filter into the foreground impulse response filter, and wherein the foreground impulse response filter is coupled to said summing node at which the predicted echo signal is subtracted from the send signal.

10. The communications system of claim 1, wherein the adaptive impulse response filter converges on the set of coefficients that characterize the echo path by iteratively correcting said coefficients to minimize residual echo determined by correlating the variance values of the received signal at successive time samples, against pulse code modulated amplitude values of the send signal.

11. A communications method comprising the steps of:
    establishing two way communications over a data transmission network using a compressed digital format for an uplink send signal and a downlink received signal, the compressed digital format comprising relatively more redundant values that predict the pulse code modulated time sample values, and relatively nonredundant values that represent variances of the pulse code modulated time sample values from predicted values;
    receiving and decompressing the received signal for a near end transceiver to produce pulse code modulated amplitude samples for driving an audio output, and providing pulse code modulated amplitude samples from an audio input to be transmitted as the uplink send signal;
    wherein the received signal of the near end transceiver is at least intermittently coupleable to the send signal of said near end receiver over an echo path by which an echo of the received signal is coupleable into the uplink send signal;
    adaptively generating a predicted echo signal by iteratively updating a series of finite impulse response filter coefficients, so as to minimize residual error in characterizing the echo path, and subtracting a predicted echo signal from the send signal, wherein the finite impulse response filter coefficients are updated based upon correlation of the variance values against the send signal; and,
    wherein said variance values for correlation of the variance values against the send signal are the same said variances of the pulse code modulated time sample values received in the compressed digital format from the data transmission network.

12. The method of claim 11, wherein the linear prediction coefficients and residual prediction error values are encoded and decoded using a Codec according to a standard applicable to digital data communications and the variances are provided by the Codec for said correlation against the send signal.

13. The method of claim 12, wherein the compressed digital format comprises linear prediction coefficients and residual prediction error values encoded and decoded according to one of a GSM (Global System for Mobile communications) standard and an AMR (Adaptive Multi-Rate) standard, applicable to mobile telephone and voice-over-Internet protocol communications.

* * * * *